UNITED STATES PATENT OFFICE.

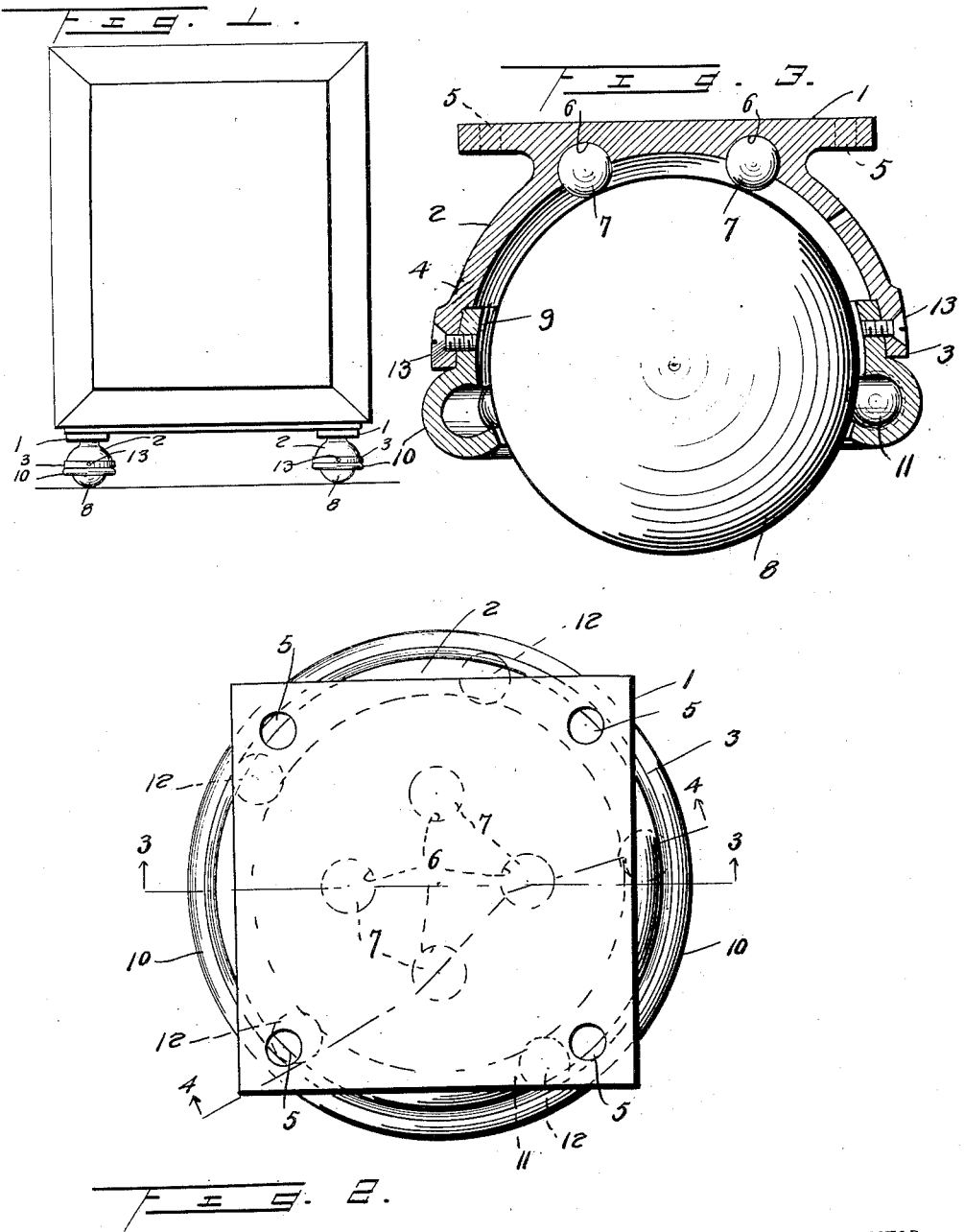

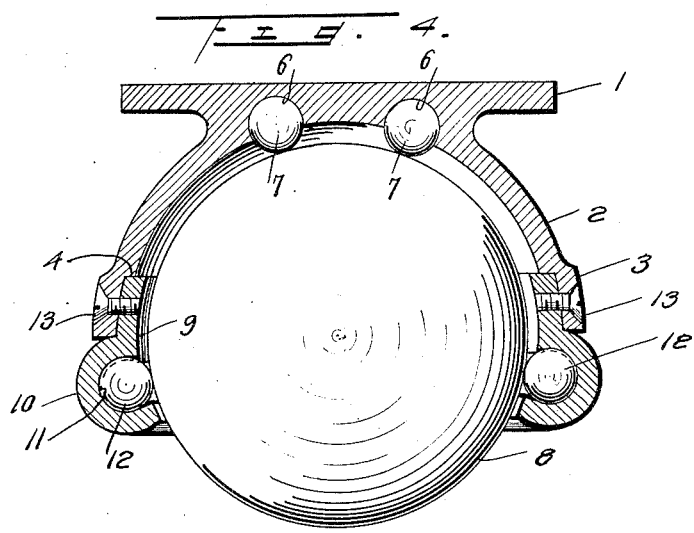
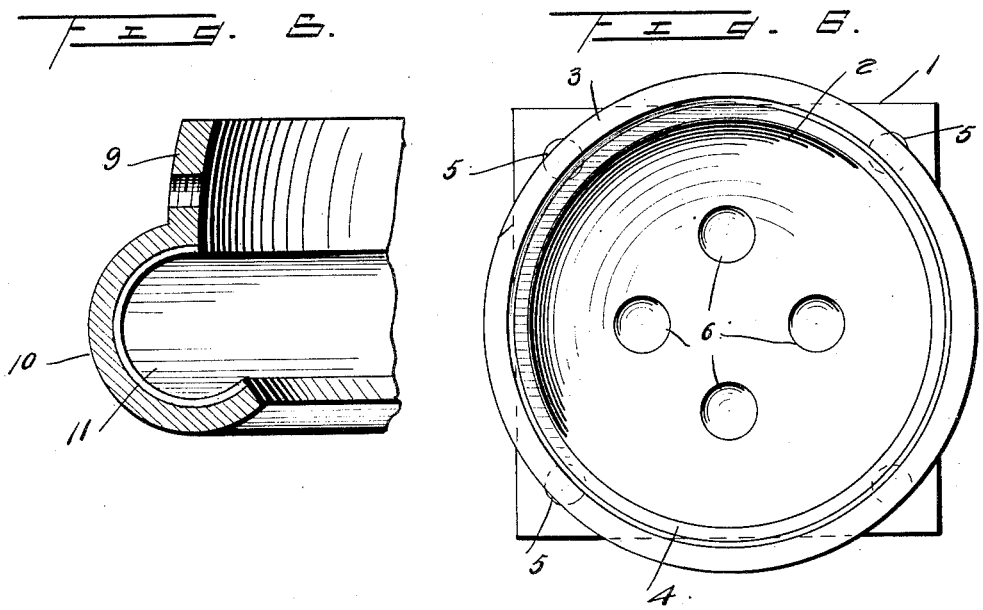

FRANCIS H. HARDON, OF NEW YORK, N. Y.

CASTER.

1,358,543. Specification of Letters Patent. Patented Nov. 9, 1920.

Application filed July 14, 1920. Serial No. 396,091.

*To all whom it may concern:*

Be it known that I, FRANCIS H. HARDON, a subject of the King of Great Britain, residing at E. 67th St., New York, in the county of New York and State of New York, have invented certain new and useful Improvements in Casters; and I do hereby declare the following to be a full, clear, and exact description of the invention, such as will enable others skilled in the art to which it appertains to make and use the same.

This invention has relation to certain new and useful improvements in a roller caster and has for its primary object the provision of a roller caster which will be of simple construction and highly efficient in use and may be readily assembled and applied to trucks and the like or removed.

The invention has for another object the provision of a roller caster of the character stated which will be composed of the minimum number of parts and which will be of such construction that the main roller caster member may be engaged at a number of points by bearing balls loosely mounted in the two sections of the roller housing so as to reduce friction to the minimum.

With the foregoing and other objects in view as will appear as the description proceeds the invention consists in the novel construction, combination and arrangement of coöperating elements as hereinafter more specifically set forth, claimed and shown in the accompanying drawings forming a part of this application and in which:

Figure 1 is an elevation of the improved form of caster applied to the bottom of a truck or the like.

Fig. 2 is a top plan view of the caster removed.

Fig. 3 is a vertical cross section on the plane of line 3—3 of Fig. 2.

Fig. 4 is a similar view on the plane of line 4—4 of Fig. 2, looking in the direction indicated by the arrows.

Fig. 5 is a detail view of the lower annular bearing ball carrying flange, removed.

Fig. 6 is a bottom plan view of the upper or body member with the lower flange and main caster roller member removed.

Referring more in detail to the drawings in which similar reference characters designate corresponding parts throughout the several views, 1 indicates the flat attaching plate of the main caster or body member of the caster and from the lower face of which extends the semi-spherical cup 2 having an outwardly offset lower edge 3, thereby providing an annular interior seat 4, the purpose of which will presently appear. A plurality of corner openings 5 are formed in the outwardly extended edge of the plate 1 to receive suitable attaching members for attaching the plate 1 to the bottom of a truck body or the like and to which the caster is to be attached, as clearly shown in the drawings.

Formed within the inner face of the semi-spherical cup 2 at the point of connection thereof with the plate 1 are a plurality of sockets 6 preferably four in number and equally spaced from the center of the cup 2 and plate 1, to receive upper bearing balls 7 which are adapted to bear upon the upper face of the main caster member or roller 8 positioned in the cup 2 and spaced from the inner face thereof, as clearly shown in Figs. 3 and 4 of the drawings.

Removably mounted in the lower edge of the semi-spherical cup 2 and resting in interior annular seat 4, is the lower flange 9 which has an outwardly bulged lower edge 10, below the portion 3 of the cup 2 and provided with a plurality of sockets 11 in its inner face to accommodate the lower bearing balls 12, which bearing balls 12 also engage the outer face of the main caster member or roller 8 at a point slightly below the center thereof, as shown at 4 of the drawings. The lower bearing balls 12 are also preferably offset from the upper bearing balls 7, thereby evenly distributing the strain on the bearing balls 7 and 12 and retaining the main caster member or roller 8 in proper position within the cup 2.

It will also be seen by referring to the drawings that the lower removable flange 9 is securely held in proper position by the cup 2 by means of suitable securing screws 13 extended through the outwardly offset portion 3 of the cup 2 and having threaded engagement in the upper portion of the flange 9. It will therefore be evident that this flange 9 may be readily removed for the purpose of replacing the main caster member or roller 8 or any of the bearing balls 7 or 12, if desired.

By referring to Fig. 3 of the drawings it will be seen that the truck 2 is provided with an oil opening 14 through which a suitable lubricant may be supplied to the roller 8 and by the latter carried to the bearing balls 7 and 12. A lubricant may also be carried in the sockets 11 and in the remainder of the bulged lower end 10 of the flange 9 and from the same supplied to the roller 8.

While the preferred embodiment of the invention has been shown and described, it will be understood that the minor changes in the details of construction and arrangement of parts may be resorted to within the scope of what is claimed without departing from the spirit of the invention.

What is claimed is:—

1. A roller caster comprising an inverted semi-spherical cup, an attaching plate formed with said cup, said cup having an outwardly offset lower edge forming an interior annular shoulder, a removable annular flange positioned in the lower portion of said cup and contacting with said shoulder, means for securing said flange in position, said flange having an outwardly offset lower portion with sockets formed in the inner face thereof, lower bearing balls mounted in said sockets, upper bearing balls carried by the central portion of said cup, and a main roller positioned in said cup, and engaging the bearing balls and the upper bearing balls to reduce friction to the minimum and relieve the main roller of strain, said lower bearing balls being offset from the upper bearing balls and contacting with the main roller at a point below the center thereof.

2. A roller caster comprising a supporting plate adapted to be attached to a member to which the caster is to be applied, a semi-spherical cup depending from said plate and formed therewith, upper bearings for said cup and spaced from one another, said cup having an oil opening formed therein, a main roller positioned in said cup and contacting with said upper bearing balls, a removable lower flange carried by said cup and having a bulged lower edge with bearing ball sockets formed therein, said bulged lower edge and sockets being adapted to contain a lubricant for said main roller, and bearing balls mounted in the sockets of said flange contacting with said main roller at a point below the center thereof.

In testimony whereof I affix my signature in presence of two witnesses.

FRANCIS H. HARDON.

Witnesses:
MICHELE PORTA,
MAX ZUCKERMAN.